(12) United States Patent
Cocchi et al.

(10) Patent No.: US 10,894,705 B2
(45) Date of Patent: Jan. 19, 2021

(54) MACHINE FOR STORING AND DISPENSING LIQUID OR SEMI-LIQUID OR SEMI-SOLID FOOD PRODUCTS

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul (IT)

(*) Notice: Subject to any disclaimer, the term of this patent is extended or adjusted under 35 U.S.C. 154(b) by 11 days.

(21) Appl. No.: 15/854,267

(22) Filed: Dec. 26, 2017

(65) Prior Publication Data
US 2018/0186617 A1   Jul. 5, 2018

(30) Foreign Application Priority Data

Dec. 30, 2016   (IT) .................. 102016000132800

(51) Int. Cl.
*B67D 1/00* (2006.01)
*B67D 1/08* (2006.01)
(Continued)

(52) U.S. Cl.
CPC ........... *B67D 1/0032* (2013.01); *A23G 9/045* (2013.01); *A23G 9/22* (2013.01); *A23G 9/28* (2013.01);
(Continued)

(58) Field of Classification Search
CPC .... F25D 23/126; F25D 31/002; F25D 25/022; F25D 25/005; B67D 1/1231;
(Continued)

(56) References Cited

U.S. PATENT DOCUMENTS 3,462,970 A * 8/1969 Natter .................. F25D 31/003
                                                      62/392
4,478,355 A * 10/1984 Houman ................ A23G 9/228
                                                      222/504
(Continued)

FOREIGN PATENT DOCUMENTS

| EP | 1186240 A1 | 3/2002 |
|----|------------|--------|
| GB | 2356390 A  | 5/2001 |

OTHER PUBLICATIONS

Italian Search Report dated Jul. 13, 2017 from counterpart Italian App No. 201600132800.

*Primary Examiner* — Nelson J Nieves
*Assistant Examiner* — Meraj A Shaikh
(74) *Attorney, Agent, or Firm* — Shuttleworth & Ingersoll, PLC; Timothy J. Klima

(57) ABSTRACT

A machine for storing and dispensing liquid or semi-liquid food products includes a refrigerated compartment internally including a supporting device for supporting at least one container of liquid or semi-liquid or semi-solid food product to be dispensed. A pump is connectable to the at least one container of liquid or semi-liquid or semi-solid food product to be dispensed. A dispensing nozzle is associated with the pump. A refrigeration system includes a refrigerating circuit associated with the refrigerated compartment to keep the compartment at a predetermined temperature. At least one door is included for closing the refrigerated compartment.

4 Claims, 3 Drawing Sheets

(51) Int. Cl.
*F25D 31/00* (2006.01)
*A23G 9/04* (2006.01)
*A23G 9/22* (2006.01)
*A23G 9/28* (2006.01)

(52) U.S. Cl.
CPC .......... *B67D 1/005* (2013.01); *B67D 1/0884* (2013.01); *F25D 31/00* (2013.01); *A23G 9/288* (2013.01); *B67D 2001/0097* (2013.01); *B67D 2210/00036* (2013.01)

(58) Field of Classification Search
CPC .... B67D 1/0894; B67D 1/0892; A23G 9/227; A23G 9/225; A23G 9/22; A23G 9/28; A23G 9/288; A23G 9/283; A23G 9/281
See application file for complete search history.

(56) References Cited

U.S. PATENT DOCUMENTS

| | | | | |
|---|---|---|---|---|
| RE33,943 E | * | 6/1992 | Arzberger | B67D 1/0028 222/129.1 |
| 5,249,706 A | * | 10/1993 | Szabo | B67D 1/0869 165/80.3 |
| 5,535,600 A | * | 7/1996 | Mills | B67D 1/0867 62/390 |
| 5,797,519 A | * | 8/1998 | Schroeder | B67D 1/0032 222/129.1 |
| 10,017,371 B2 | * | 7/2018 | Vulpitta | A23G 9/22 |

* cited by examiner

US 10,894,705 B2

MACHINE FOR STORING AND DISPENSING LIQUID OR SEMI-LIQUID OR SEMI-SOLID FOOD PRODUCTS

This application claims priority to Italian Patent Application No. 102016000132800 filed Dec. 30, 2016, the entirety of which is incorporated by reference herein.

BACKGROUND OF THE INVENTION

This invention relates to a machine for storing and dispensing liquid or semi-liquid or semi-solid food products, specifically food products with a high viscosity such as, for example, dessert creams, ice creams, semifreddi, milkshakes or particularly dense mixtures.

More specifically, the machine is adapted to dispense food products which must be kept (and dispensed) at temperatures below 0° C. (preferably, but not necessarily, between −6° C. and −3° C.). A particularly strongly felt need in the trade is that for a solution which is particularly safe in terms of food hygiene and which is at once easy and practical to use.

Another particularly strongly felt need in the trade is that for a machine which is capable of fluidly dispensing the aforestated food products kept at a temperature below 0° C.

SUMMARY OF THE INVENTION

The aim of this invention, therefore, is to meet the above mentioned need by providing a machine for storing and dispensing liquid or semi-liquid or semi-solid food products, specifically food products with a high viscosity (greater than water).

A further aim of this invention is to provide a machine for storing and dispensing liquid or semi-liquid or semi-solid food products, which avoids direct handling of the food product, that is to say, which is particularly safe in terms of food hygiene.

A yet further aim of this invention is to provide a machine for storing and dispensing liquid or semi-liquid or semi-solid food products, which is particularly easy to clean and whose maintenance is greatly simplified.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

DESCRIPTION OF THE PREFERRED EMBODIMENTS

Figure 1:
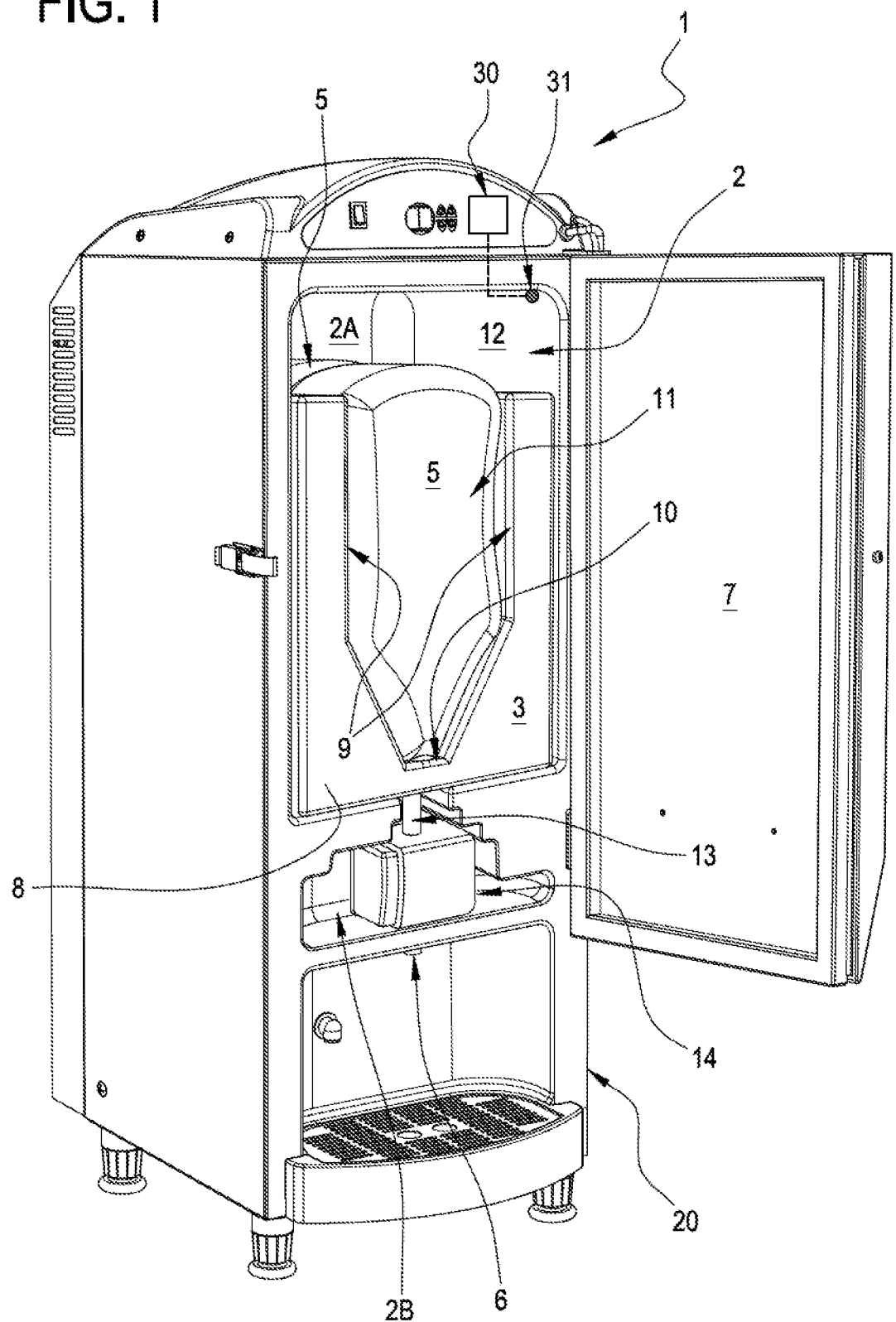
FIG. 1 is a schematic view of a first embodiment of a machine forming the object of the invention, for storing and dispensing liquid or semi-liquid or semi-solid food products.

With reference to the accompanying drawings, the numeral 1 denotes a machine according to this invention, for storing and dispensing liquid or semi-liquid or semi-solid food products (the liquid or semi-liquid food products being particularly viscous, specifically having viscosity higher than water).

The machine 1 is capable of storing and dispensing food products such as, by way of non-limiting example, dessert creams, ice creams, semifreddi, milkshakes or particularly dense mixtures.

It should be noted that, preferably and more generally speaking, these food products are products which must be kept (and dispensed) at temperatures below 0° C. (preferably, but not necessarily, between −6° C. and −3° C.).

The machine 1 for storing and dispensing liquid or semi-liquid or semi-solid food products comprises, in combination:

a refrigerated compartment 2 internally comprising:

supporting means 3 for supporting at least one container 5 of liquid or semi-liquid or semi-solid food product to be dispensed;

a pump 4 connectable to the at least one container 5 of liquid or semi-liquid or semi-solid food product to be dispensed;

a dispensing nozzle 6 associated with (the bottom of) the pump 4;

a refrigeration system comprising a refrigerating circuit associated with the refrigerated compartment to keep it at a predetermined temperature;

at least one door 7 for closing the refrigerated compartment 2.

It should be noted that the door 7 is hinged to a frame 20 of the machine 1.

Figure 2:
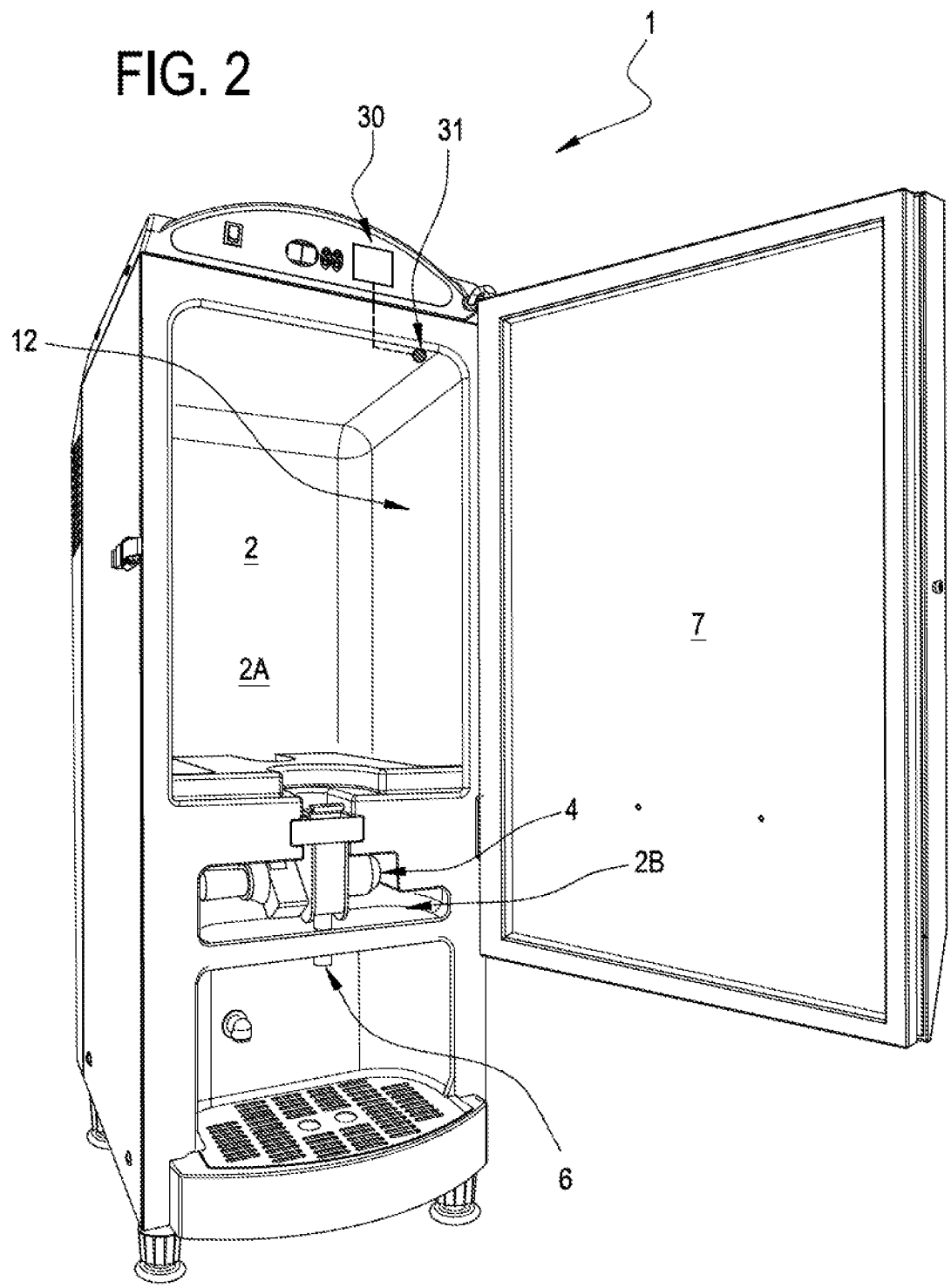
FIG. 2 is a schematic view of a second embodiment of a machine forming the object of the invention, for storing and dispensing liquid or semi-liquid or semi-solid food products.
Figure 3:
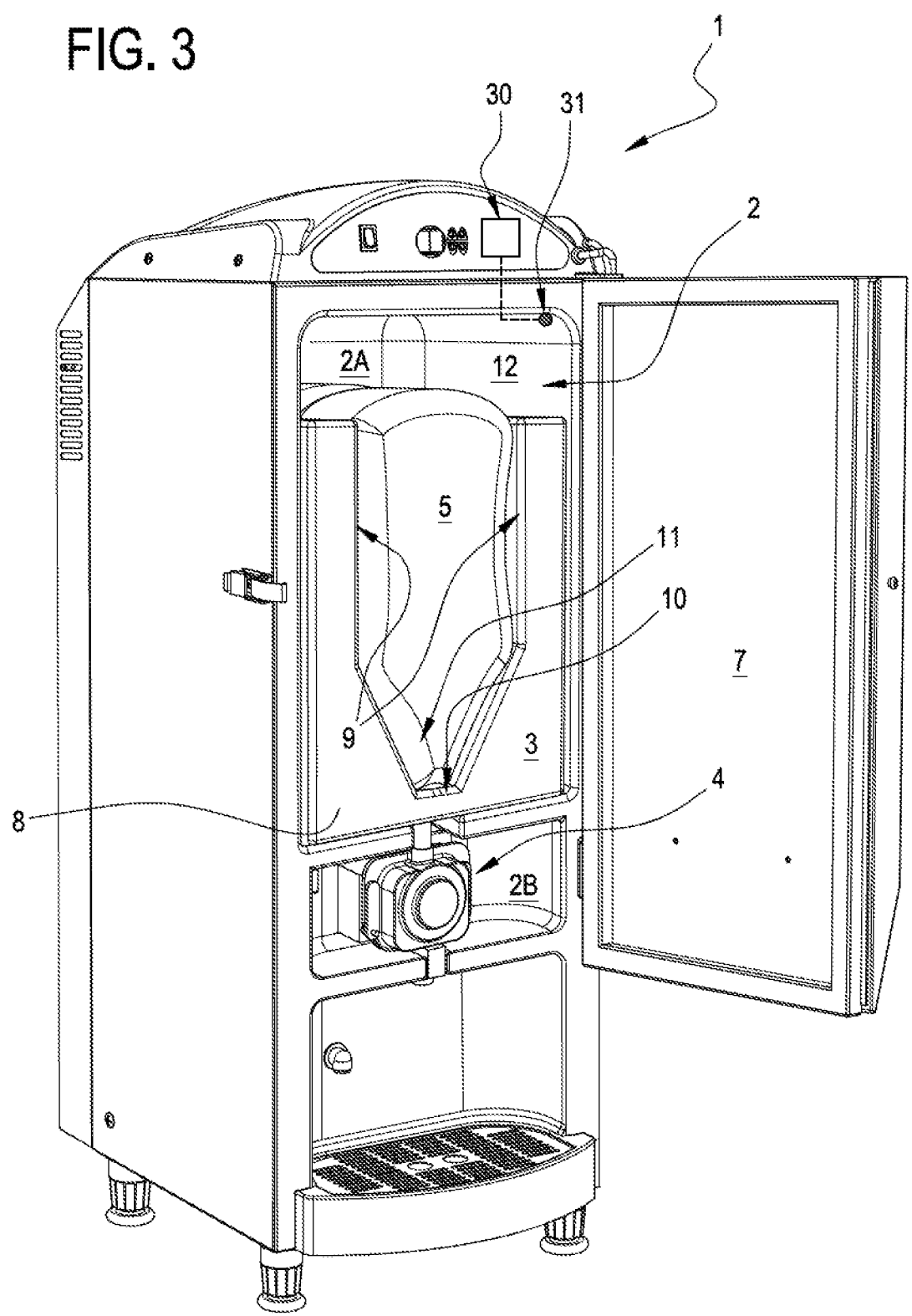
FIG. 3 is a schematic view of a third embodiment of a machine forming the object of the invention, for storing and dispensing liquid or semi-liquid or semi-solid food products.

The door 7 is thus movable between a closed position, where the compartment 2 is closed, to an open positon, where it is open (the latter being illustrated in FIGS. 1 to 3).

It should be noted that the supporting means 3 are located in the compartment 2, above the pump 4.

More precisely, the pump 4 is connectable to the container 5 by means of a pipe 13.

More precisely, the refrigerated compartment 2 comprises a first chamber 2A which houses the supporting means 3 for supporting the at least one container 5 of liquid or semi-liquid or semi-solid food product to be dispensed and a second chamber 2B which houses the pump 4.

Thus, the container 5 and the pump 4 are preferably located in two different refrigerated chambers (2A, 2B).

The refrigerated chambers (2A, 2B) may or may not be in communication with each other.

The door 7 for closing the refrigerated compartment may be single or multiple: in some embodiments not illustrated, the refrigerated chambers (2A, 2B) may be closed by different doors.

According to another aspect, the machine 1 comprises a motor for driving the pump 4, located outside the refrigerated compartment 2 and mechanically connected to the pump 4.

The supporting means 3 for supporting the at least one container 5 of liquid or semi-liquid or semi-solid food product to be dispensed comprise at least one supporting element 8 located inside the refrigerated compartment 2.

Preferably, the supporting element 8 is removable from the refrigerated compartment 2.

Preferably, as illustrated, the supporting element 8 comprises a pair of side walls 9 and a bottom wall 10, defining a housing 11 for holding the container 5 of a liquid or semi-liquid or semi-solid food product to be dispensed.

It should be noted that the housing 11 for holding the liquid or semi-liquid or semi-solid food product to be dispensed is at least partly tapered.

Preferably, the side walls 9 of the supporting element 8 are disposed to face side walls 12 of the refrigerated compartment 2, in order to avoid direct contact (which could cause the food product to become spoiled) between the walls of the container 5 of liquid or semi-liquid or semi-solid food product to be dispensed and the side walls 12 of the refrigerated compartment 2.

It should be noted, therefore, that the supporting element 8 prevents the container 5 of the liquid or semi-liquid or semi-solid food product to be dispensed from being in contact with the side walls of the refrigerated compartment 2.

In effect, that would lead to overcooling (in particular, localized overcooling) of the liquid or semi-liquid or semi-solid food product to be dispensed, making it less fluid and more difficult to be properly dispensed.

In effect, as is known, the temperature of the walls of the refrigerated compartment 2 is normally lower than that of the food product inside the container 5 and of the air inside the refrigerated compartment 2.

Advantageously, thanks to the aforesaid feature, the machine therefore allows particularly effective dispensing of food products such as creams, for example, which, to be stored correctly, must be kept at temperatures below 0° C.

Furthermore, in use, the supporting element 8 supports the container 5 of the liquid or semi-liquid or semi-solid food product in such a way as to guarantee that the container 5 of the liquid or semi-liquid or semi-solid food product can be properly emptied.

In effect, the container 5 of the liquid or semi-liquid or semi-solid food product is kept inside the housing 11 in an optimum position for dispensing.

According to another aspect, the at least one container 5 of liquid or semi-liquid or semi-solid food product to be dispensed and the housing 11 are shaped to match each other (in other words, the container 5 has the same shape as the housing 11).

Preferably, the container 5 is a rigid container.

Alternatively, the container 5 is a soft container (that is, one whose volume changes depending on how full it is).

In an embodiment not illustrated, the container 5 is of the bag-in-box type, that is, it comprises a first container which contains the food product and which is located inside a second container).

Preferably, the first container is made of plastic material.

Preferably, the container 5 (in particular if it is of the bag-in-box type) may be provided with a pipe for dispensing the food product (and attached to the container 5).

If the pump is peristaltic, the dispensing pipe is preferably inserted partly into the pump (and cut to size).

That way, the dispensing pipe becomes a pump component which is periodically compressed during the rotation of the pump rotor so as to allow the product to be dispensed.

Advantageously, therefore, it should be noted that every time the container 5 is changed, the dispensing pipe is also changed together with the container, thereby increasing the food safety of the machine 1.

It should be noted that the machine 1 preferably comprises an electronic drive and control unit 30, as would be understood by the person of ordinary skill in the art.

Preferably, the drive and control unit 30 controls the refrigeration system in such a way as to keep the inside of the refrigerated compartment 2 at a (preset) temperature below 0° C. (more preferably, between −8° C. and −2° C., and still more preferably, between −6° C. and −3° C.).

Preferably, the machine 1 also comprises a temperature sensor 31 (located preferably inside the compartment 2 or in the immediate vicinity of, or associated with, the refrigeration system), electrically connected to the drive and control unit 30 to allow controlling the refrigeration system (in order to keep the refrigerated compartment 2 at the aforesaid temperature).

The machine 1 also comprises an interface for controlling the refrigeration system, specifically for setting the temperature the refrigerated compartment 2 is to be kept at.

It should also be noted that the interface allows turning the pump 4 on and off for dispensing purposes.

It should be noted that when the pump 4 is on, it allows dispensing the food product contained inside the container 5 connected to the pump.

The pump 4 may be a pump of any kind.

More specifically, the pump 4 may preferably be chosen from the following group: volumetric pump, peristaltic pump, flexible vane pump, lobe pump, membrane pump, gear pump.

Advantageously, the fact that the pump 4 is mounted inside the refrigerated compartment 2 prevents the proliferation of bacteria, thus increasing food safety.

It should be noted that the substantial difference between FIGS. 1-3 lies in the different structure of the pump 4, which is different in each of the figures.

Further, in FIG. 2, the supporting means 3 for supporting at least one container 5 of liquid or semi-liquid or semi-solid food product to be dispensed are not illustrated in the compartment 2 (they are substantially the same as those illustrated in FIGS. 1 and 3).

With reference to the vertical layout of the components, it is noted that the machine 1 comprises, from the top down: supporting container 5, pump 4 and dispensing nozzle 6.

As is evident from the foregoing description, the machine 1 allows both storing the food product (at a temperature preferably below 0° C.) and dispensing it.

It should be noted that the machine 1 is advantageously very easy to clean and its maintenance is much simplified.

In effect, the number of components that require cleaning/maintenance is particularly limited and, what is more, the fact that the pump 4 is mounted inside the refrigerated compartment 2 means that cleaning can be carried out less frequently.

Furthermore, the easily accessible position of the container 5 and of the pump 4 greatly facilitates the work of operators responsible for cleaning and/or maintenance, when necessary.

Moreover, the need for the operator to directly handle the product is substantially avoided, thus reducing the risk of product contamination and increasing food safety.

What is claimed is:

1. A machine for storing and dispensing liquid or semi-liquid or semi-solid food products, comprising, in combination:
   a refrigerated compartment internally comprising:
      a supporting device for supporting at least one container of liquid or semi-liquid or semi-solid food product to be dispensed, the supporting device comprising a supporting element including at least one supporting wall located inside the refrigerated compartment;
      a pump connectable to the at least one container of liquid or semi-liquid or semi-solid food product to be dispensed;
      a pipe connecting the at least one container of liquid or semi-liquid or semi-solid food product with the pump;
   a dispensing nozzle operatively connected with the pump;

a refrigeration system comprising a refrigerating circuit operatively connected with the refrigerated compartment to keep the refrigerated compartment at a predetermined temperature;

a single door for closing the refrigerated compartment;

wherein the refrigerated compartment comprises a first chamber which houses the supporting device and a second chamber which houses the pump, with both the first chamber and the second chamber being refrigerated, the pipe having a first portion in the first chamber, a second portion in the second chamber and passing through a bottom part of the supporting element;

wherein the first chamber includes a pair of first side walls;

wherein the single door is sized and positioned to close both the first chamber and the second chamber when the single door is closed and to allow access to both the first chamber and the second chamber when the single door is opened:

wherein the at least one supporting wall comprises a pair of second side walls and a bottom wall, defining a housing for holding the at least one container;

wherein the pair of second side walls are positioned between the at least one container and the pair of first side walls to space the at least one container away from the pair of first side walls to prevent contact between the at least one container and the pair of first side walls;

wherein the at least one container and the housing have complementary shapes, wherein a lower part of the pair of second side walls is symmetrically tapered container;

wherein the at least one container is rigid and includes a bottom part which is symmetrically tapered corresponding to the taper of the pair of second side walls;

an electronic drive and control unit configured to control the refrigeration system to maintain a temperature range in the refrigerated compartment;

a temperature sensor electrically connected to the electronic drive and control unit to allow controlling the refrigeration system to keep the refrigerated compartment in the temperature range;

an interface connected to the electronic drive and control unit for setting the temperature range.

2. The machine according to claim 1, comprising a motor for driving the pump, located outside the refrigerated compartment and mechanically connected to the pump.

3. The machine according to claim 1, wherein the side walls are disposed to face side walls of the refrigerated compartment, to avoid direct contact between the walls of the at least one container and the side walls of the refrigerated compartment.

4. The machine according to claim 1, wherein the pump is a pump selected from the group consisting of: volumetric pump, peristaltic pump, flexible vane pump, lobe pump, membrane pump, gear pump.

* * * * *